(12) United States Patent
Hovakimyan et al.

(10) Patent No.: US 8,340,171 B2
(45) Date of Patent: Dec. 25, 2012

(54) METHOD AND APPARATUS FOR IMPROVING COMMUNICATION SYSTEM PERFORMANCE IN TOMLINSON HARASHIMA PRECODING (THP) MODE WITH A ZERO EDGE FILTER

(75) Inventors: Karen Hovakimyan, Sunnyvale, CA (US); Igor Djokovic, Irvine, CA (US)

(73) Assignee: Netlogic Microsystems, Inc., Santa Clara, CA (US)

( * ) Notice: Subject to any disclaimer, the term of this patent is extended or adjusted under 35 U.S.C. 154(b) by 852 days.

(21) Appl. No.: 12/421,521

(22) Filed: Apr. 9, 2009

(65) Prior Publication Data

US 2010/0260253 A1 Oct. 14, 2010

(51) Int. Cl.
*H04L 27/01* (2006.01)
*H04B 1/10* (2006.01)
(52) U.S. Cl. ........................................ 375/233; 375/350
(58) Field of Classification Search .................. 375/259, 375/316, 324; 708/300, 322, 323; 379/340, 379/398, 387.02; 324/607; 341/126, 127, 341/128, 155, 156, 159
See application file for complete search history.

(56) References Cited

U.S. PATENT DOCUMENTS

| | | | | |
|---|---|---|---|---|
| 6,996,168 | B2 * | 2/2006 | Hirasaka | 375/229 |
| 2006/0133303 | A1 * | 6/2006 | Shida | 370/286 |
| 2008/0297382 | A1 * | 12/2008 | Risbo | 341/53 |

OTHER PUBLICATIONS

Moulin, Real-Time Equalization of A/D Converter Nonlinearities, ISCAS 1989, p. 262-267 a system implementing at least one of an analog to digital converter, generate zero at Nyquist frequency and adaptive equalizer.*
U.S. Appl. No. 12/973,735, filed Dec. 20, 2010, Lin.
U.S. Appl. No. 12/973,797, filed Dec. 20, 2010, Lin.
U.S. Appl. No. 12/973,819, filed Dec. 20, 2010, Lin.
Naofal Al-Dhahir, "MMSE Decision-Feedback Equalizers: Finite-Length Results, IEEE Transactions on Information Theory", vol. 41, No. 4, Jul. 4, 1995, pp. 961-975.
Hiroshi Harashima, et al., "Matched-Transmission Technique for Channels with Intersymbol Interference", IEEE Transactions on Communications, vol. COM-20, No. 4, Aug. 1972, pp. 774-780.
Sahid U.H. Qureshi, "Adaptive Equalization", Proceedings of the IEEE vol. 73, No. 9, Sep. 1985, pp. 1349-1387.
Jack Salz, "On Mean-Square Decision Feedback Equalization and Timing Phase", IEEE Transactions on Communications, vol. COM-25, No. 12, Dec. 1997, pp. 1471-1476.

* cited by examiner

*Primary Examiner* — Khanh C Tran
(74) *Attorney, Agent, or Firm* — Sterne, Kessler, Goldstein & Fox, P.L.L.C.

(57) ABSTRACT

An improved Tomlinson Harashima Precoding (THP) communication system through special configuration of its feedback coefficients is disclosed. Improvement, in terms of THP system robustness against analog-to-digital (ADC) sampling phase variation, is achieved either by deriving feedback coefficients of the Decision Feedback Equalizer at worst ADC sampling phase or by inserting a Zero Edge Filter (ZEF) at the receiver. The ZEF modifies the communication system such that the feedback filter coefficients derived in the Decision Feedback Equalizer (DFE) mode and later used in the THP mode is capable to compensate the zero at Nyquist Frequency due to a non-optimum sampling, phase of the ADC. The THP communication system, modified and improved with the insertion of ZEF, is operable to switch from an adaptive Decision Feedback Equalizer (DFE) mode to a THP mode having an adaptive Linear Equalizer (LE) at the receiver.

21 Claims, 6 Drawing Sheets

METHOD AND APPARATUS FOR IMPROVING COMMUNICATION SYSTEM PERFORMANCE IN TOMLINSON HARASHIMA PRECODING (THP) MODE WITH A ZERO EDGE FILTER

FIELD OF THE INVENTION

The invention relates to a method and apparatus to improve communication system performance in Tomlinson Harashima Precoding (THP) mode by a Zero Edge Filter.

BACKGROUND

Performance of a communication system comprising a transmitter, a receiver, and a communication channel, is highly sensitive to the analog-to-digital converter (ADC) sampling phase when ADC operates at symbol rate. Performance of the communication system is defined as signal-to-noise (SNR) ratio at the output of the decision device of the receiver. To compensate for that sensitivity and because of low enhancement of noise, a Decision Feedback Equalizer (DFE) is preferred over a symbol rate Linear Equalizer (LE) at the receiver because a DFE may have an adaptive feedback mechanism capable of better correcting the corrupted received data and variations in the channel compared to the LE based receiver. A THP communication system is commonly derived from the DFE system by moving the feedback part of the DFE to the transmitter. Some key advantages of the DFE based systems are lost in the THP communications system, since THP system has a linear receiver, without an adaptive feedback mechanism.

Referring back to the DFE based system, since the estimated data at the receiver can be erroneous because, for example, the noise coupled with the received signal and intersymbol interference, the feedback mechanism of the DFE receiver will further generate an incorrect data. In other words, erroneous data will enter into the feedback mechanism of the DFE based receiver which will generate inaccurate feedback filter output. This inaccurate output is subtracted from the received signal. The subtracted signal is then input to a decision device that further generates inaccurate data. The inaccurate data from the decision device then enters the feedback filter again, and so the cyclic process continues to generate inaccurate data. This cyclic process is known as error propagation.

To fix this problem of error propagation, a THP communication scheme is employed. Unlike the DFE based system, the THP system comprises a feedback filter that resides in the transmitter and hence actual transmit data and not estimated data (which may be erroneous) enters the feedback filter. Since the data for transmission is the actual data rather than estimated data, there is no problem of error propagation in THP based communication system.

However, the transmitter in the THP system is not capable to cope with error associated with the sampling phase of the ADC at the receiver because the receiver is in LE mode i.e. there is no feedback mechanism at the receiver. Indeed, the filter coefficients at the transmitter of the THP system are derived for a particular sampling phase of the ADC and are frozen once derived. This means that should sampling phase of the ADC change there is no adaptive feedback mechanism in the THP communication system to adjust the system to the new sampling phase of the ADC, and so the system relies on adaptive mechanism of only the Linear Equalizer at the receiver. Hence, the receiver may still experience a low SNR (thus lower performance) at the output of its decision device if the sampling phase of the ADC changes.

SUMMARY OF THE INVENTION

The invention relates to a method and apparatus of an improved THP communication system through special configuration of its feedback coefficients. Improvement, in terms of the robustness of the THP system against the ADC sampling phase variation, is achieved by inserting a Zero Edge Filter (ZEF) at the receiver or by special choice of THP feedback coefficients.

In one embodiment, a receiver apparatus comprises an ADC configured to receive data; a ZEF, coupled with the ADC, to generate a zero at Nyquist frequency, an adaptive Linear Equalizer and a decision device (DEC), coupled with the Linear Equalizer, to output the estimation of the received data. The receiver apparatus further comprises a first adaptive Feedback (FB) filter coupled with the DEC via an adder, wherein the first adaptive FB filter generates filter coefficients to compensate the zero at Nyquist frequency generated by the ZEF. The receiver is coupled with a transmitter via a communication channel, wherein the transmitter has a second FB filter, and wherein the second FB filter of the transmitter is operable to apply filter coefficients from the first FB filter of the receiver when switching from DFE to THP mode of operation. As a result the modified THP communication system (which includes the ZEF in the receiver) offers better performance in terms of signal-to-noise ratio (SNR) at the output of the receiver than traditional THP based communication systems when ADC sampling phase changes.

In one embodiment, the improved THP communication system is achieved by generating at a receiver a zero at Nyquist frequency by the ZEF; determining first adaptive FB filter coefficients at the receiver operating in an adaptive DFE mode to compensate the zero at Nyquist Frequency; and configuring the receiver to operate in an adaptive LE mode after switching from DFE to THP mode of operation. The method further comprising configuring the transmitter, coupled with the receiver via a communication channel, to apply the first adaptive FB filter coefficients from the receiver to the transmitter operating in the THP mode. Any adaptive mechanism such as LMS (Least Mean Square), RLS (Recursive Least Squares) or other mechanisms may be used to adjust coefficients of the DFE including its Linear (FF) part and its FB part.

BRIEF DESCRIPTION OF THE DRAWINGS

The invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The embodiments discussed herein generally relate to a method and apparatus for improving communication system performance in THP based systems. Referring to the figures, exemplary embodiments are described. The exemplary embodiments are provided to illustrate the embodiments and should not be construed as limiting the scope of the embodiments.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In one embodiment of the invention, a Zero Edge Filter (ZEF) at the receiver is implemented that results in the feedback filter of the receiver in DFE mode to generate special filter coefficients. These special filter coefficients adapt the receiver in response to the ZEF. These special filter coefficients of the receiver are then implemented on the feedback filter of the transmitter configured to operate in THP mode—the receiver is now switched to operate in the LE mode. The special filter coefficients at the transmitter processes the data for transmission so that the receiver in LE mode is capable of withstanding changes in the sampling phase of the ADC without lowering the SNR of the received signal at the output of a decision device. Consequently, the overall THP communication system is robust to changing sampling phase of the ADC. The following sections describe the above invention in various embodiments.

Figure 1:
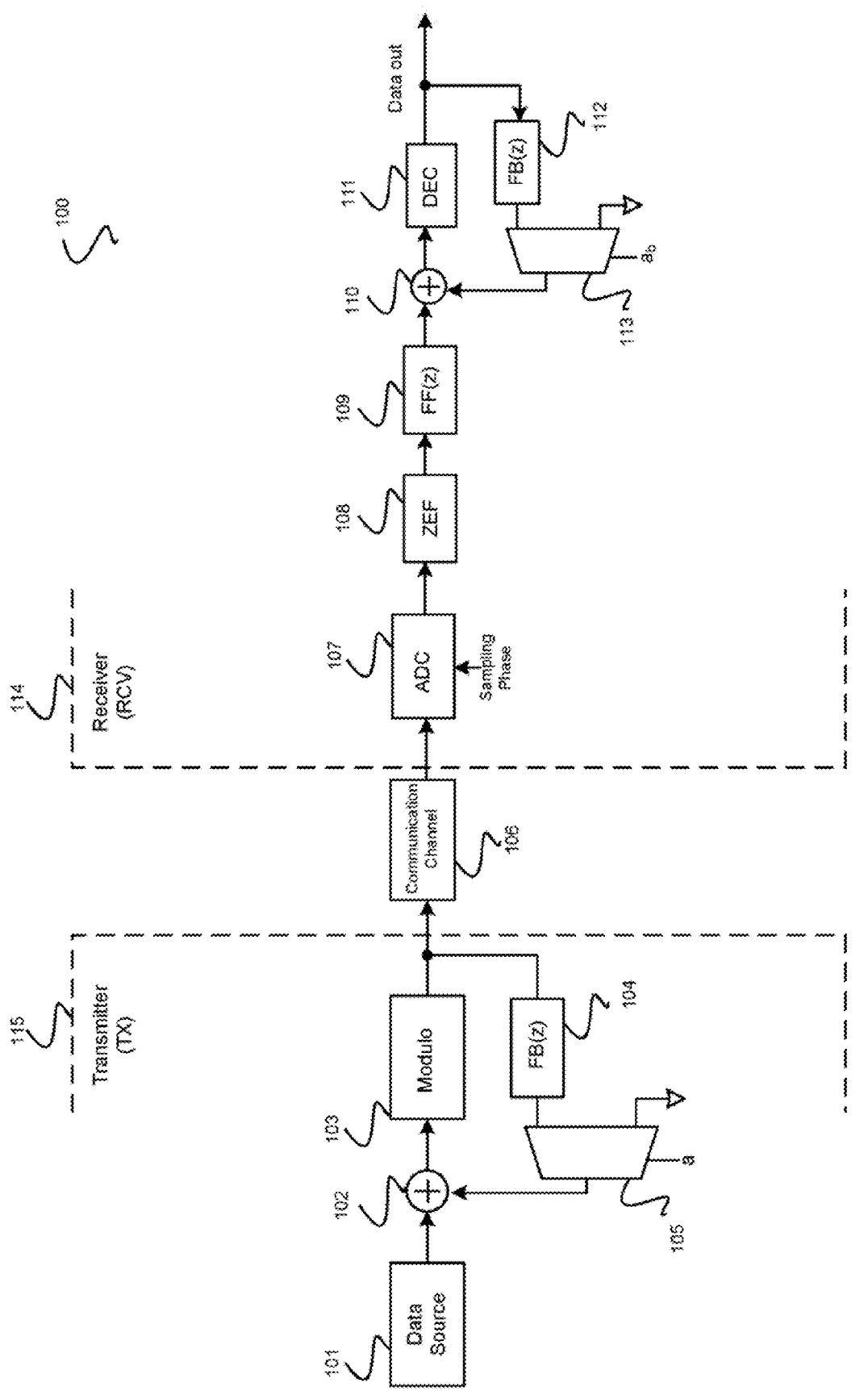
FIG. 1 is a modified Tomlinson Harashima Precoding (THP) system with a Zero Edge Filter (ZEF) according to one embodiment of the invention.

A. Improved THP System Overview:

FIG. 1 illustrates an improved THP system 100 capable of transmitting data via a communication channel 106 to a receiver 114, according to one embodiment of the invention. The transmitter 115 is a simplified block diagram of a transmitter operating in THP mode. A person skilled in the art would appreciate that other components associated with the transmitter and/or the receiver are not shown so as not to obscure the invention. For example, the analog part of the receiver is not shown as a separate block and is assumed to be a part of Communication Channel 106. Data to be transmitted arrives at the data source 101 which is then processed by a modulo device 103. In one embodiment, the modulo device 103 performs non-linear operation for PAM M signaling. In one embodiment, the modulo operation is defined as:

$$Mod_{out} = mod(Mod_{in} + M, 2M) - M$$

where mod ( ) function, in one embodiment, implements modulo 2M operation on the argument, $Mod_{in} + M$, and where $Mod_{in}$ is the input to the modulo device and $Mod_{out}$ is the output of the modulo device.

The data is filtered via a feedback (FB) filter 104 that applies any known filtering technique such as Finite Impulse Response, Infinite Impulse Response, etc. The FB filter 104 processes the data for transmission. This data is the actual transmit data.

The multiplexer 105, controlled by signal "a," allows the transmitter 115 to select the output of the FB filter 104 and ground (or zero data), according to one embodiment of the invention. As later explained, the multiplexer 105 is initially set to configure the communication system into a DFE communication system. In one embodiment, the input of the multiplexer 105 which is connected to ground (zero data) is selected and summed at 102. Once the receiver 114 switches from DFE mode to LE mode, both multiplexers 105 and 113 are configured to achieve an improved THP mode.

In one embodiment, the multiplexer 105 is configured so that the output of the FB filter 104 is selected and summed at 102. In another embodiment, the multiplexer 113 is configured so that the ground signal (zero data) is selected and summed at 110. In one embodiment, the multiplexer control signals, a and $a_b$, are complementary signals.

The communication channel 106 is a high level block representing known analog portions of the transmitter 115, the receiver 114, and the communication means such as cables, transmission lines, etc. The communication channel 106 couples the transmitter 115 with the receiver 114. In one embodiment, the communication means is a 100 m CAT6 cable between the transmitter 115 and the receiver 114.

The receiver 114 is capable of operating in adaptive feedback equalizer mode (when system is in DFE configuration) and adaptive linear equalizer mode (when system is in THP configuration), according to one embodiment of the invention. In one embodiment, the data transmitted from the transmitter 114 via the communication channel 106 is sampled by the ADC 107. The output spectrum generated by the ADC 107 depends on the sampling phase of the ADC 107. In one embodiment, when there is no control over the sampling phase of the ADC, a Zero Edge Filter (ZEF) 108 is coupled with the ADC 107.

Figure 4A:
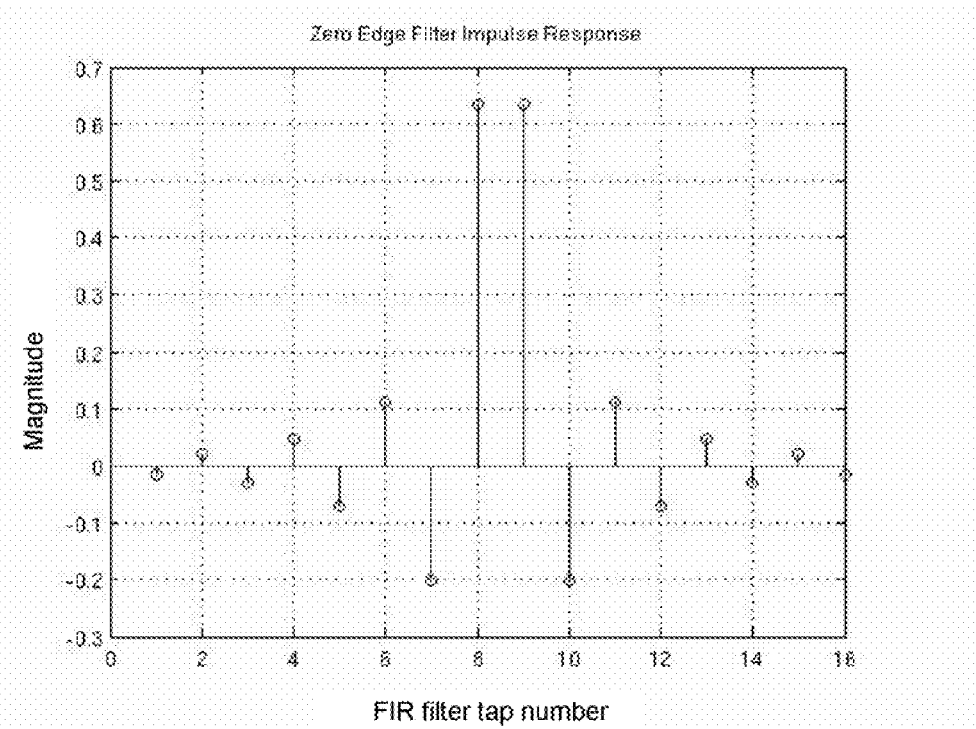
FIG. 4a and FIG. 4b illustrate an impulse response of the Zero Edge Filter (ZEF) and a frequency response (gain and phase) of the ZEF, respectively, according to one embodiment of the invention.
Figure 4B:
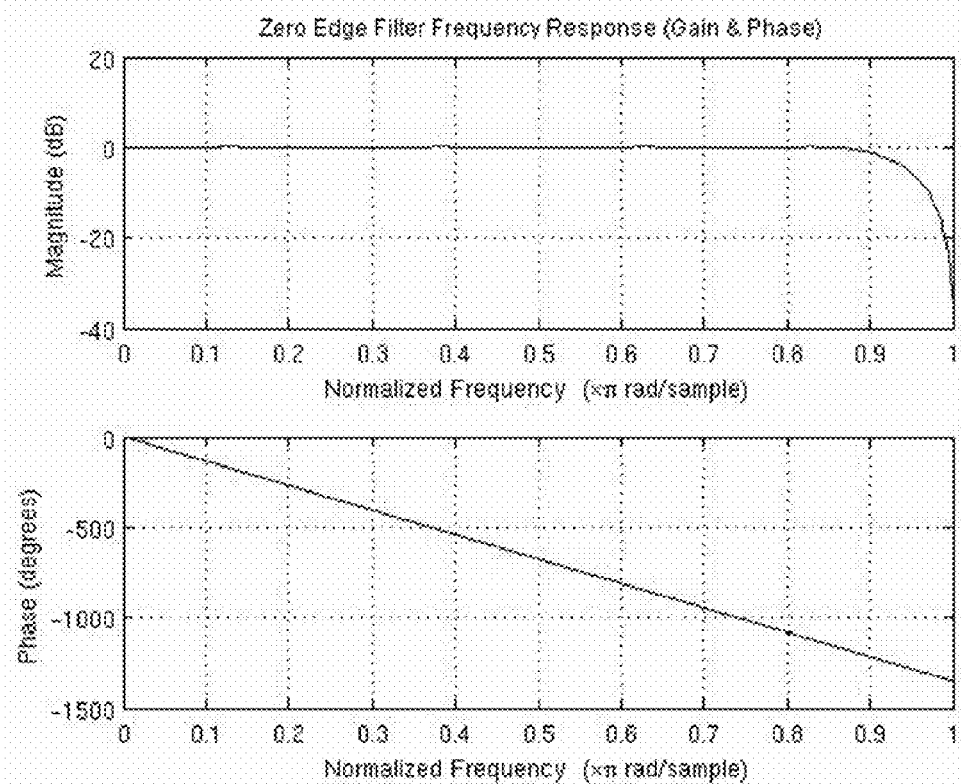

In one embodiment, the ZEF 108, implemented as a 16 tap FIR (finite impulse response) filter, has an impulse response and a frequency response (gain and phase plots) represented by FIG. 4a and FIG. 4b, respectively.

Referring back to FIG. 1, in one embodiment, the ZEF 108 is operable to generate a zero (null) at Nyquist Frequency on the received data. In another embodiment, a ZEF 108 is decoupled from the ADC 107 when the communication system allows control over sampling phase of the ADC 107.

The term, control over sampling phase, means that the communication system is capable of choosing the ADC sampling phase resulting in an output signal with the worst SNR at the input of decision device (DEC) 111. Control over sampling phase, however, is not required after switching to the THP mode. In one embodiment, both the linear and the feedback components of the DFE operate at symbol rate.

Figure 2:
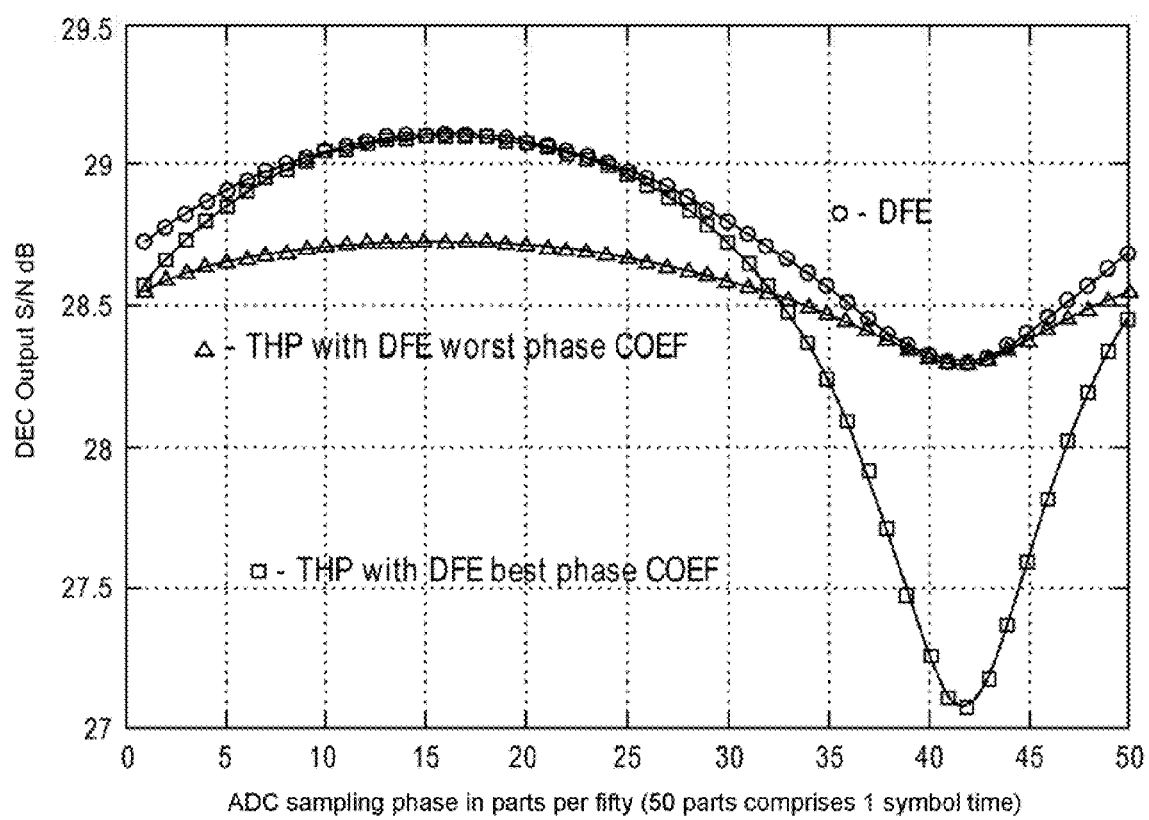
FIG. 2 is an illustration of system performance operating in Decision Feedback Equalizer (DFE) and THP modes.

For example, in one embodiment based on FIG. 2 the receiver 114 generates a signal with a SNR of 27 dB at sampling phase #42 (or (42/50)*2*pi radians) at the input of the DEC 111 which follows a linear equalizer feed-forward (FF) filter 109 having 64 taps. In one embodiment, the digital equalizer (DEQ) includes the FF filter 109 and the FB filter 112 loop (including the multiplexer 113).

Referring back to FIG. 1, in one embodiment, the FF filter 109 represents the linear component of the DEQ while the FB filter 112 represents the feedback component of the DEQ. In one embodiment, these two components (linear and feedback) create a DFE. In THP mode of operation, the feedback component of the DFE is bypassed by selecting the zero (ground) input of the multiplexer 113 thus resulting in system having a FF filter 109—a Linear Equalizer.

In one embodiment, the Linear Equalizer includes a modulo device (not shown in FIG. 1) coupled with the FF filter 109 and the DEC 111.

In one embodiment, the ADC is an 8 bit converter. In one embodiment, an additive white Gaussian noise (AWGN) of −145 dBm/Hz is added to the received signal.

In another embodiment, the ADC 107 generates a signal with a SNR of 29 dB at sampling phase #15 (or $(15/50)*2*pi$ radians). A lower SNR (27 dB in the above example corresponding to sampling phase #42) is worse than a higher SNR (29 dB in the above example corresponding to sampling phase #15). By having control over sampling phase, the communication system can select a sampling phase resulting in the worst SNR. In one embodiment, the control over the sampling phase is programmable by hardware or software.

Determination of the worst SNR for a given sampling phase range is made, in one embodiment, by comparators (not shown in FIG. 1) that compare a previous SNR at the output of the DEC 111 with the new SNR at the output of the DEC 111 caused by the change in the sampling phase of the ADC 107. Other embodiments of determining worst SNR can be used without obscuring the invention. For example, in one embodiment, signal power after the ADC 107 at Nyquist Frequency is measured for different ADC sampling phases. In such an embodiment, the sampling phase with lowest signal power at Nyquist frequency will correspond to the worst sampling phase.

Referring back to FIG. 1, in one embodiment the ZEF 108 is coupled with an adaptive FF filter 109 which is shown in z-domain. The output of the ZEF 108 is fed to the FF filter 109 which is then summed by the adder 110 with the output of the multiplexer 113. The output of the multiplexer 113, controlled by $a_b$, is either the feedback signal from the FB filter 112 or the zero data (ground signal). The summed output is then fed into the decision divice, DEC 111. In one embodiment a DFE system is achieved when the multiplexer select signal, "a," selects the zero data (ground signal) for multiplexer 105, and therefore multiplexer 113 selects the output of the FB filter 112.

In one embodiment, the FB filter 112 is adaptive. In one embodiment, both the FB filter 112 and the FF filter 109 are adaptive filters.

In another embodiment, an improved THP system is achieved when the multiplexer selects the output of the FB filter 104, in the transmitter 115, and zero data (ground signal) at the receiver 114. In one embodiment, the multiplexer select signals, a and $a_b$, are controlled by a control unit (not shown in FIG. 1) that uses information related to control of the sampling phase that generates a worst SNR, and/or information related to compensating the zero generated by the ZEF 108.

B. Improved THP System Using Controllable Sampling Phase:

Referring back to FIG. 2, a set of three curves describing the performance of the communication system, based on the SNR at the input of the DEC 111, is illustrated according to one embodiment of the invention. The purpose of FIG. 2 is to illustrate an embodiment of the improved THP communication system that is configured with a mechanism to control the sampling phase of the ADC and to determine the best and the worst SNR for a range of sampling phase.

According to one embodiment, the improved THP communication system which applies feedback coefficients at the transmitter end which are based on the worst SNR across a range of the ADC sampling phase of the communication system operating in DFE mode (i.e. feedback path of transmitter is disabled while the feedback path of the receiver is enabled via respective multiplexers or other such means), will offer the best performance of the communication system (i.e. higher SNR) over subsequent changes in the sampling phase in THP mode (i.e. the feedback path of the transmitter is enabled while the feedback path of the receiver is disabled via respective multiplexers or other such means).

In one embodiment, the three curves of FIG. 2 illustrate how the SNR varies over ADC sampling phase for a communication system operating in DFE mode, and in THP modes at two different conditions. The curves of FIG. 2 are generated for a communication system having an 8 bit ADC, an equalizer having 64 FF taps, and a system with AWGN of −145 dBm/Hz, a 100 m CAT6 communication cable, and a PAM 16 signaling method with baud rate of 800 MHz. These curves are for illustration purposes only to explain the invention. Other communication systems with different specifications will result in different curves.

The operation of the improved THP based communication system, which is configured with a mechanism to control the sampling phase in DFE mode (without subsequent control of sampling phase in THP mode) and to determine the worst SNR at DFE mode, is discussed in reference to the communication system of FIG. 1.

The curve represented by circles (circle curve) refers to the communication system operating in DFE mode according to one embodiment of the invention. The circle curve, in one embodiment, shows timing phase sensitivity represented by SNR, computed at the input of the DEC 111, of about 1 dB across an ADC sampling phase range covering the whole range of 1 symbol time. For this particular illustration, a sensitivity of 1 dB SNR across the entire sampling range means a communication system with high tolerance to sampling phase variations, and hence a high performance communications system. The ZEF 108 is bypassed in this embodiment.

The other two curves in FIG. 2, represented by triangles and squares, show performance of the same communication system when configured to operate in THP mode i.e. the receiver 114 is operating in LE mode (by disabling the feedback unit 112 by the multiplexer 113) while the transmitter 115 has a feedback component enabled via the multiplexer 105. The ZEF 108 is bypassed in this embodiment. The triangle and the square curves are generated by computing the SNR at the DEC 111 input for two kinds of filter coefficients applied to the feedback unit 104 of the transmitter 115.

The first kind of filter coefficients are based on the DFE feedback coefficients, associated with the FB filter 112 of the receiver 114, when the DFE based communication system (that generated the circle curve) is operating at its best performance in the sampling phase range. The best performance, according to the above embodiment, for the DFE based communication system is based on a sampling phase when the SNR is of highest value in the sampling phase range. In one embodiment, as shown in FIG. 2, the highest SNR is achieved when the sampling phase is at #15 (or $(15/50)*2*pi$ radians).

The second kind of filter coefficients are based on the DFE feedback coefficients, associated with the FB filter 112 of the receiver 114, when the DFE based communication system (that generated the circle curve) is operating at its worst performance in the sampling phase range. The worst performance, according to the above embodiment, for the DFE based communication system is when the SNR has the lowest value in the sampling phase range. In one embodiment, as shown in FIG. 2, the lowest SNR is achieved when the sampling phase is at #42 (or (42/50)*2*pi radians).

In one embodiment, a compare unit (not shown in FIG. 1) is used to determine the worst performance of the DFE communication system based on the lowest (worst) SNR for a given ADC sampling phase. In one embodiment, the worst SNR is also determined by measuring power of the signal at Nyquist frequency.

Upon determining the worst SNR by the compare unit, the filter coefficients of the FB filter 112 are saved and applied to the FB filter 104 of the transmitter 115. In one embodiment, these coefficients are transferred from the receiver 114 having FB filter 112 to the transmitter 115 via the same communication channel 106. In one embodiment, the transfer of coefficients from the receiver 114 to the transmitter 115 happens via another communications channel. In one embodiment, the transfer of coefficients happens during initial handshaking or training.

In one embodiment, the FB filter 104 in THP mode (i.e. the FB filter 104 is enabled by the multiplexer 105) filters the data from the data source 101 by applying the feedback coefficients of the FB filter 112 at the transmitter. The resulting THP performance at the input of the DEC 111 (curve with triangles in FIG. 2) has a higher tolerance to subsequent ADC sampling phase variation (higher SNR for the non-optimum sampling phases) than THP performance when the feedback coefficients of the FB filter 112 are derived at the best SNR in DFE mode (curve with squares in FIG. 2). Consequently, the overall THP communication system is robust to changing sampling phase of the ADC when feedback coefficients are derived for the worst sampling phase in DFE mode.

C. Improved THP System with ZEF:

In one embodiment of the invention, when the communication system lacks control (or has limited control) of sampling phase to determine the worst and/or the best SNR across an ADC sampling phase range in DFE mode of operation, a ZEF 108 is used at the receiver (ZEF is no longer bypassed). The improved THP communication system with a ZEF 108, according to one embodiment, is shown in FIG. 1.

Referring back to FIG. 1, in one embodiment, the ZEF 108 generates a zero (null) at Nyquist frequency on the received data spectrum. A conventional LE based system, which does not include a feedback mechanism at the receiver, is not adept to compensate the zero generated by the ZEF 108.

However, an adaptive DFE based communication system can compensate the zero (null) by determining (or adapting) filter coefficients of the FB filter 112 that generates a corresponding pole to cancel out the zero generated by the ZEF 108. The filter coefficients of the FB filter 112 are then applied to the FB filter 104 at the transmitter. In one embodiment, these coefficients are transferred from the receiver 114 having FB filter 112 to the transmitter 115 via the same communication channel 106. In one embodiment, the transfer of coefficients from the receiver 114 to the transmitter 115 happens via another communications channel. In one embodiment, the transfer of coefficients happens during initial handshaking or training of the communication system.

Once the FB filter 104 receives the filter coefficients of the FB filter 112, the multiplexer 105 enables the FB filter 104, which was previously disabled. At that moment, the receiver is configured to adaptive LE mode (i.e. the system is in THP mode) by disabling the FB filter 112 of the DFE mode.

The transmitter 115 then applies the transferred filter coefficients on the actual data for transmission, via the FB filter 104. These filter coefficients are capable to compensate the null (zero) generated by the ZEF 108 while having a linear system at the receiver 114. Consequently, the overall THP communication system is robust to changing sampling phase of the ADC.

In one embodiment, the ZEF 108 is bypassed once the transmitter applies the filter coefficients capable of compensating the null because the system is able to tolerate the null generated by the ZEF 108. In another embodiment, the ZEF 108 is not bypassed after the transmitter applies the filter coefficients capable of compensating the null because the ZEF 108 does not impact the performance of the system. In one embodiment, the linear system is an adaptive LE system. LE systems, unlike DFE systems, do not exhibit error propagation because LE systems do not have a feedback filter in the receiver.

Figure 3:
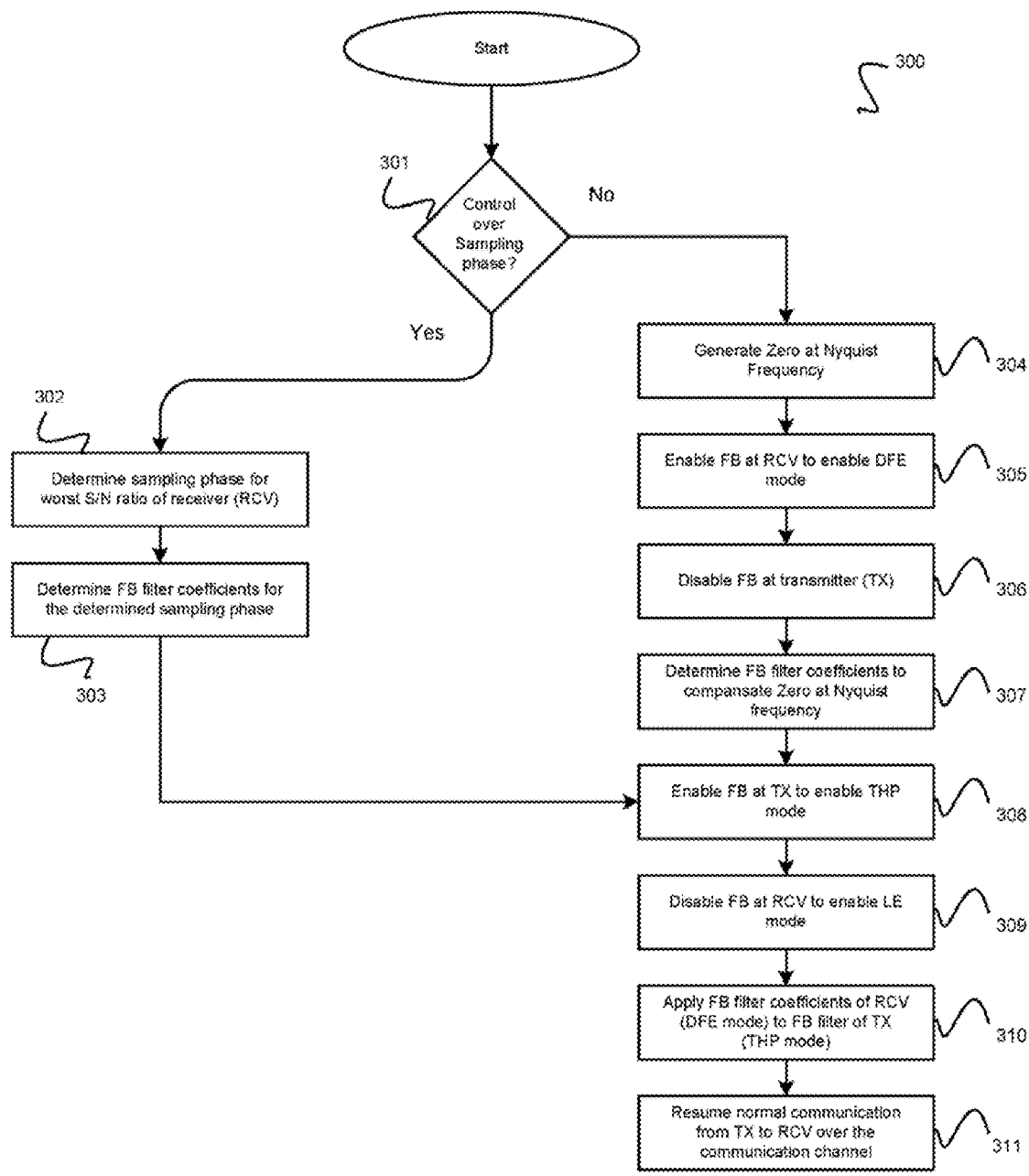
FIG. 3 is a flowchart illustrating the operation of the modified THP system according to one embodiment of the invention.

D. Process of Operating The Improved THP System:

FIG. 3 is a flowchart 300 illustrating the operation of the improved THP based communication system according to one embodiment of the invention. At 301 a determination is made regarding the capability of the communication system. Particularly, it is determined whether the communication system is capable of controlling the ADC sampling phase in DFE mode. If there is such capability, then 302 and 303 are performed.

At 302, the sampling phase resulting in the worst SNR (lowest value for a complete sampling phase range, for example, one symbol time) is determined. At 303, feedback filter coefficients of the FB filter 112 are determined (through adaptation of coefficients) that correspond to the sampling phase determined at 302. At 308, the FB filter 104 at the transmitter is enabled via the multiplexer. At 309, the FB filter 112 at the receiver is disabled so as to configure the communications system as a THP system having an adaptive LE mode based receiver instead of the adaptive DFE mode based receiver. The ZEF 108 is bypassed for this communication system. At 310, the FB filter coefficients of the FB filter 112, which were generated in DFE mode for the sampling phase that resulted in the worst SNR, are applied to the FB filter 104 of the transmitter. At 311, after exchange of feedback coefficients is over, the THP communication system begins to operate in normal data mode.

If the communication system has no or limited capability to control the ADC sampling phase to generate the worst SNR at the output of the DEC 111, processes 304-311 are followed.

At 304, the ZEF 108 generates a zero (null) at Nyquist frequency. At 305, the communication system is configured to operate in adaptive DFE mode. The configuration is achieved by enabling the FB filter 112 of the receiver via the multiplexer 113, and by disabling the FB filter 104 of the transmitter via the multiplexer 105 as identified by processes 305 and 306 respectively. At 307, the FB filter coefficients at the receiver 114 are determined through adaptation of the FB filter 112 to compensate the zero (null) generated by the ZEF 108.

In one embodiment, the filter coefficients, corresponding to compensating the zero (null) at Nyquist frequency at the ADC, are saved at the receiver 114 and then transmitted from the receiver 114 back to the transmitter 115.

Upon determining the feedback filter coefficients to compensate the zero (null), the communication system is reconfigured to operate in the improved THP mode having special coefficients by enabling the FB filter 104 via the multiplexer 105, and disabling the FB filter 112 via the multiplexer 113. The above process is described by 308 and 309 respectively.

At 310, the feedback coefficients corresponding to compensating the zero (null) are applied to the FB filter 104 at the transmitter. At 311, normal communication between the transmitter 115 and the receiver 114 occurs in the improved THP based communication system.

In one embodiment, the ZEF 108 is bypassed once the transmitter applies the filter coefficients capable of compensating the hull because the system is able to tolerate the null generated either by the ZEF 108 or by the worst sampling phase of ADC. In another embodiment, the ZEF 108 is not bypassed after the transmitter applies the filter coefficients capable of compensating the null. In one embodiment, the linear system is an adaptive LE based system.

The actual data for transmission from the transmitter 115 is processed by the transferred feedback coefficients, and so the system is tolerant (robust) to sampling phase variation since the system can compensate the zero (null) at Nyquist frequency (created at the worst sampling phase) through properly chosen THP coefficients.

Figure 5:
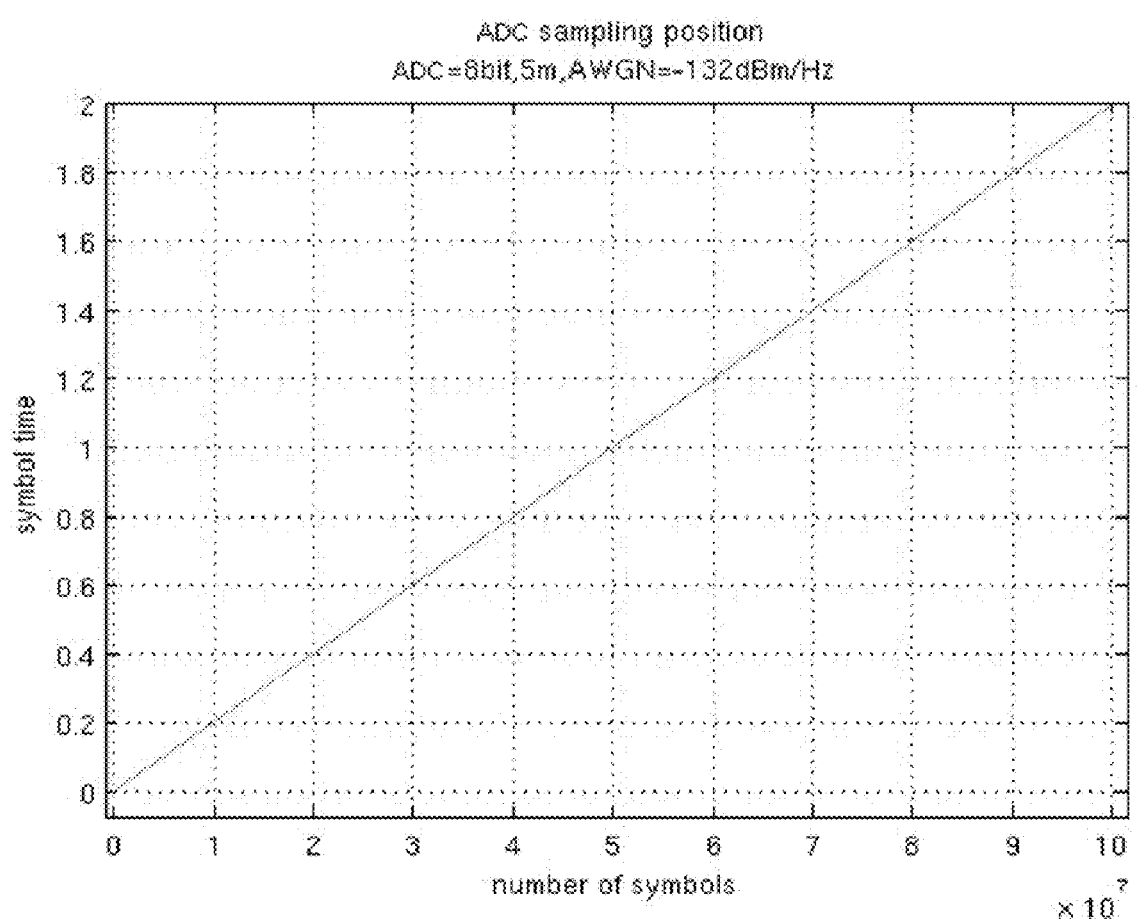
FIG. 5 illustrates sampling phase change of the analog-to-digital converter (ADC) for determining the performance of the communication system with and without the ZEF, according to one embodiment of the invention.
Figure 6A:
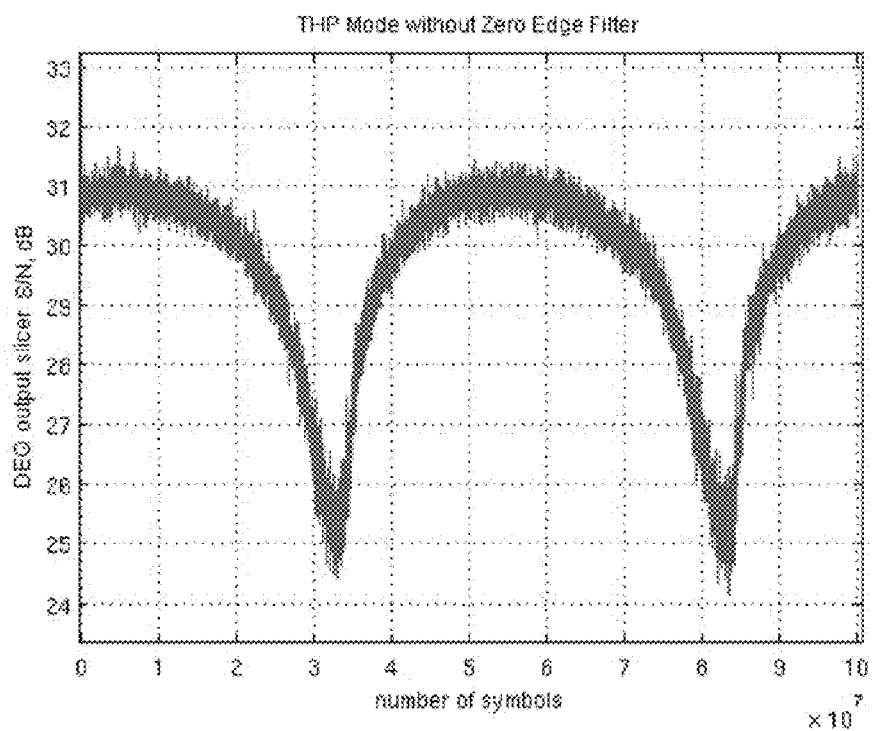
FIG. 6a and FIG. 6b illustrate the THP communication system performance with and without ZEF, respectively, according to one embodiment of the invention.
Figure 6B:
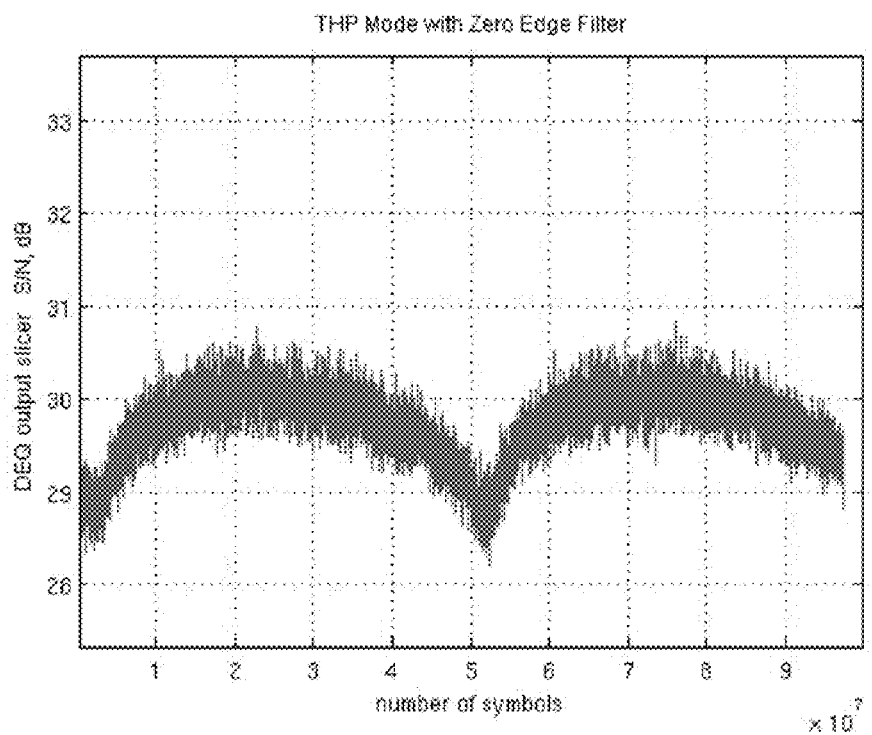

FIG. 5, FIG. 6a, and FIG. 6b illustrate the performance of the THP based communication systems with and without the ZEF 108 (when there is no control over ADC sampling phase), according to one embodiment of the invention. The performance is measured by computing the SNR at the output of the DEQ (which is the input of DEC 111). In one embodiment, the DEQ includes the feed-forward (FF) filter 109. In such an embodiment, the FB filter 112 is switched off (grounded, using the multiplexer 113).

FIG. 5, according to one embodiment, shows sampling phase of an ADC that is linearly ramped at a ramp rate of 2 symbol-time over 20 million symbols. The communication channel 106, for this embodiment, includes a 5 m CAT6 cable. THP communication system with the adaptive LE based receiver (i.e. no feedback enabled in the receiver) consumes the output of the ADC for two embodiments.

In the first embodiment, the ZEF 108 is bypassed in DFE mode when THP coefficients were derived through adaptation. The SNR, at the input of the DEC 111, of such a system in THP mode, according to one embodiment, is shown by FIG. 6a. The SNR for that embodiment ranges from approximately 24 dB to 31 dB depending on the ADC sampling phase.

In the second embodiment which illustrated the improved THP system, the ZEF 108 is enabled (i.e. not bypassed) in the DFE mode preceding the THP mode. The SNR of such a system at the input of the DEC 111 (without bypassed ZEF 108), according to one embodiment, is shown by FIG. 6b. The SNR for that embodiment ranges from approximately 28 dB to 30.5 dB. The second embodiment has a tighter SNR spread resulting in better performance than the first embodiment when compared over the whole (complete) sampling phase range. Consequently, the overall THP communication system is robust to changing sampling phase of the ADC.

While the invention has been described in conjunction with specific embodiments thereof, many alternatives, modifications and variations will be apparent to those of ordinary skill in the art in light of the foregoing description. For example, any filter structure could replace the described filters of the invention or any type of adaptive mechanism can be used to determine the equalizer filter coefficients. Accordingly, the invention is intended to embrace all such alternatives, modifications, and variations as to fall within the broad scope of the appended claims.

We claim:

1. A receiver apparatus comprising:
   an analog-to-digital converter (ADC) having a sampling phase, the ADC configured to receive data;
   a zero edge filter (ZEF), coupled with the ADC, to generate a zero at Nyquist frequency;
   an adaptive linear equalizer (LE) coupled with the ZEF; and a decision device (DEC) coupled with the adaptive LE to output estimated data which is robust against changes in the sampling phase of the ADC.

2. The receiver apparatus of claim 1, further comprising a first adaptive feedback (EB) filter electrically coupled with the DEC via an adder.

3. The receiver apparatus of claim 2, wherein the first adaptive FB filter generates filter coefficients to compensate the zero at Nyquist frequency generated by the ZEF.

4. The receiver apparatus of claim 2, wherein the DEC is coupled with the adaptive LE via the adder.

5. The receiver apparatus of claim 1, wherein the adaptive LE includes an adaptive feed-forward (FF) filter.

6. The receiver apparatus of claim 1, wherein the sampling phase of the ADC is operable at symbol rate.

7. The receiver apparatus of claim 1, wherein the sampling phase is operable to generate a worst signal-to-noise ratio (SNR) at an input of the DEC.

8. The receiver apparatus of claim 2, further comprising a multiplexer coupled with the first adaptive FB filter and the adder.

9. The receiver apparatus of claim 8, wherein the multiplexer selects between an adaptive Decision Feedback Equalizer (DFE) mode and an adaptive LE mode.

10. The receiver apparatus of claim 1, wherein the ADC is coupled with a transmitter operable to transmit the data via a communication channel.

11. The receiver apparatus of claim 10, wherein the transmitter is operable to transmit the data in an adaptive Decision Feedback Equalizer (DFE) mode and in a Tomlinson Harashima Precoding (THP) mode.

12. The receiver apparatus of claim 10, wherein the transmitter includes: a data source to receive the data for transmission; and a modulo device coupled with the data source and with the communication channel.

13. The receiver apparatus of claim 12, wherein the transmitter includes:
   a second feedback (FB) filter coupled with the modulo device;
   an adder coupled with the data source and the modulo device; and
   a multiplexer coupled with the second FB filter and electrically coupled with the modulo device.

14. The receiver apparatus of claim 13, wherein the multiplexer is operable to configure the transmitter to transmit data in one of the THP mode and the adaptive DFE mode.

15. The receiver apparatus of claim 13, wherein the second FB filter of the transmitter is operable to apply filter coefficients from the first adaptive FB filter of the receiver.

16. A method comprising:
   generating at a receiver a zero at Nyquist frequency by a zero edge filter (ZEF);
   determining first adaptive feedback (FB) filter coefficients at the receiver operating in an adaptive Decision Feedback Equalizer (DFE) mode to compensate the zero at Nyquist frequency; and
   configuring the receiver to operate in an adaptive linear equalizer (LE) mode in response to the determining of the first adaptive FB filter coefficients.

17. The method of claim 16, further comprising:
   configuring a transmitter, coupled with the receiver, the transmitter operable to transmit data, to the receiver, in a Tomlinson Harashima Precoding (THP) mode and the adaptive DFE mode.

18. The method of claim 17, further comprising switching from the adaptive DFE mode to the THP mode in response to the determining of the first adaptive FB filter coefficients.

19. The method of claim 17, further comprising configuring the transmitter to apply the first adaptive FB filter coefficients from the receiver to the transmitter operating in the THP mode.

20. The method of claim 19, wherein configuring the transmitter to apply the first adaptive FB filter coefficients from the receiver to the transmitter operating in the THP mode includes applying the first adaptive FB filter coefficients to a second FE filter of the transmitter operating in the THP mode.

21. The method of claim 16, wherein the configuring of the receiver to operate in the adaptive LE mode includes disabling the first adaptive FB filter of the adaptive DFE mode.

\* \* \* \* \*